United States Patent [19]
Haas et al.

[11] Patent Number: 5,667,544
[45] Date of Patent: Sep. 16, 1997

[54] EXTENDED LIFE FILTER APPARATUS

[75] Inventors: Daniel R. Haas, Oldham, Ky.; Brian K. Baer, Washington, Ark.

[73] Assignee: AAF International, Louisville, Ky.

[21] Appl. No.: 638,582

[22] Filed: Apr. 29, 1996

[51] Int. Cl.$^6$ .................. B01D 39/14; B01D 46/10
[52] U.S. Cl. ................. 55/382; 55/484; 55/487; 55/524; 55/527; 55/DIG. 12; 55/DIG. 24
[58] Field of Search ............... 55/381, 382, 483, 55/484, 486–488, 524, 527, DIG. 12, DIG. 24; 210/484

[56] References Cited

U.S. PATENT DOCUMENTS

| | | |
|---|---|---|
| 561,884 | 7/1896 | Smith et al. |
| 2,044,221 | 6/1936 | Myers et al. ............... 55/483 |
| 2,077,951 | 4/1937 | Myers ............... 55/483 |
| 2,579,984 | 12/1951 | Trowbridge ............... 55/524 |
| 2,586,935 | 2/1952 | Gerson ............... 55/486 X |
| 2,843,341 | 7/1958 | Dannenberg et al. ............... 55/487 X |
| 2,980,204 | 4/1961 | Jordan ............... 55/524 X |
| 3,102,014 | 8/1963 | Aitkenhead ............... 55/487 X |
| 3,201,926 | 8/1965 | Harrington ............... 55/486 |
| 3,252,274 | 5/1966 | Benson et al. ............... 55/382 X |
| 3,388,535 | 6/1968 | Nash ............... 55/524 X |
| 3,388,536 | 6/1968 | Nash ............... 55/524 X |
| 3,399,516 | 9/1968 | Hough, Jr. et al. ............... 55/487 |
| 3,400,520 | 9/1968 | Sakurai ............... 55/487 |
| 3,422,602 | 1/1969 | Janson ............... 55/DIG. 12 |
| 3,505,794 | 4/1970 | Nutter et al. ............... 55/527 X |
| 3,710,948 | 1/1973 | Sexton et al. ............... 210/484 |
| 3,774,375 | 11/1973 | Smith ............... 55/382 |
| 4,093,437 | 6/1978 | Ichihara et al. ............... 55/487 |
| 4,102,785 | 7/1978 | Head et al. ............... 55/524 X |
| 4,164,400 | 8/1979 | Wald ............... 55/487 X |
| 4,197,100 | 4/1980 | Hausheer ............... 55/382 |
| 4,668,394 | 5/1987 | Badolato et al. ............... 55/483 X |
| 4,702,940 | 10/1987 | Nakayama et al. ............... 55/487 X |
| 4,983,193 | 1/1991 | Tani et al. ............... 55/487 |
| 5,096,473 | 3/1992 | Sassa et al. ............... 55/486 X |
| 5,244,703 | 9/1993 | Bosses ............... 55/382 X |
| 5,269,925 | 12/1993 | Broadhurst ............... 55/DIG. 24 |
| 5,283,106 | 2/1994 | Seiler et al. ............... 55/524 X |
| 5,389,121 | 2/1995 | Pfeffer ............... 55/527 X |
| 5,437,701 | 8/1995 | Townsley ............... 55/486 |
| 5,496,627 | 3/1996 | Bagrodia et al. ............... 428/284 |

FOREIGN PATENT DOCUMENTS 2036591  7/1980  United Kingdom.

*Primary Examiner*—Robert Spitzer
*Attorney, Agent, or Firm*—Polster, Lieder, Woodruff & Lucchesi

[57] ABSTRACT

A particulate filter for a fluid stream being of preselected thickness with progressively increasing fibrous density from the upstream face toward the downstream face, the filter having a transversely and uniformly extending planar sheet-like adhesive barrier at a preselected location and quantity between the upstream and downstream faces thereof.

14 Claims, 5 Drawing Sheets

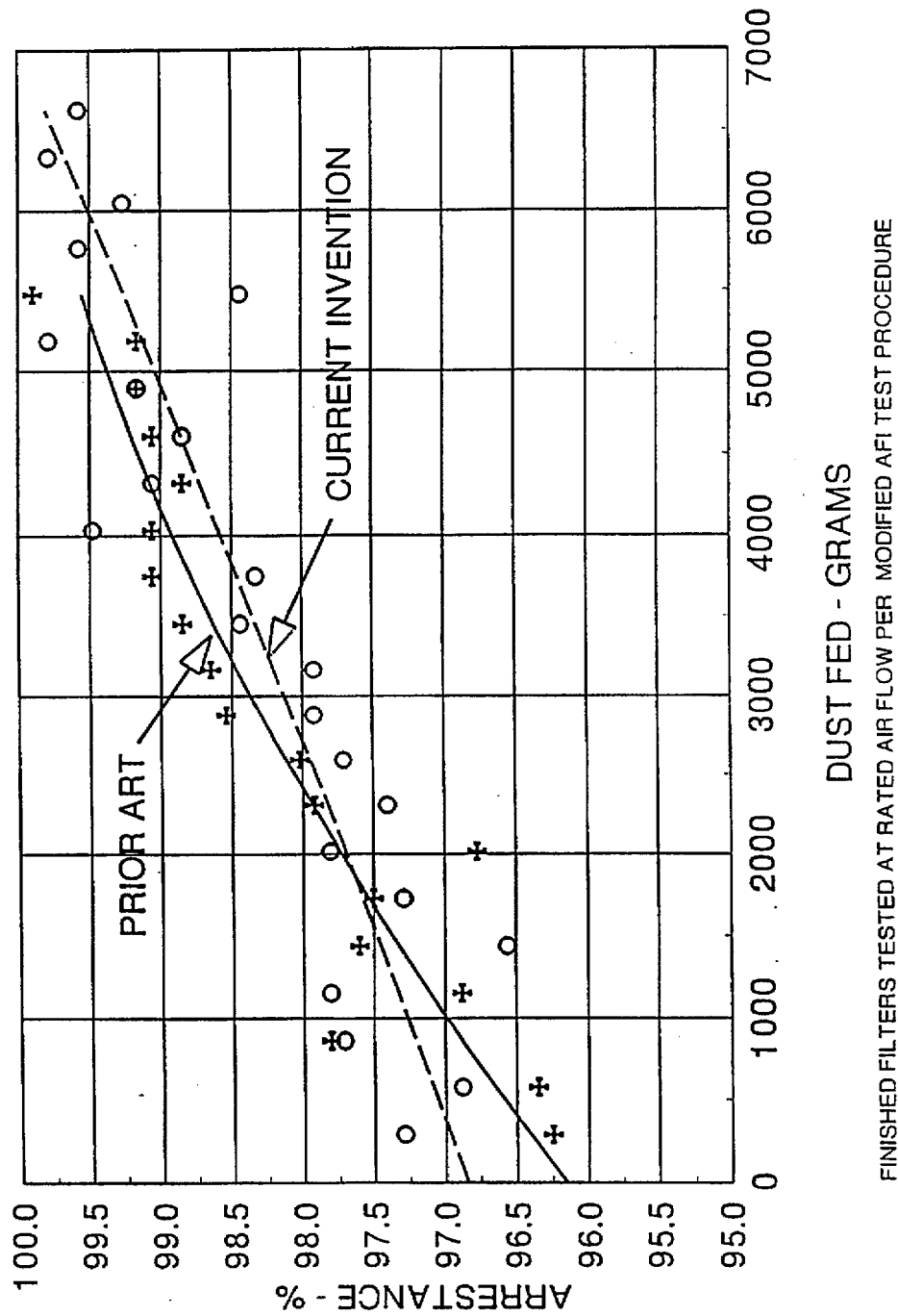

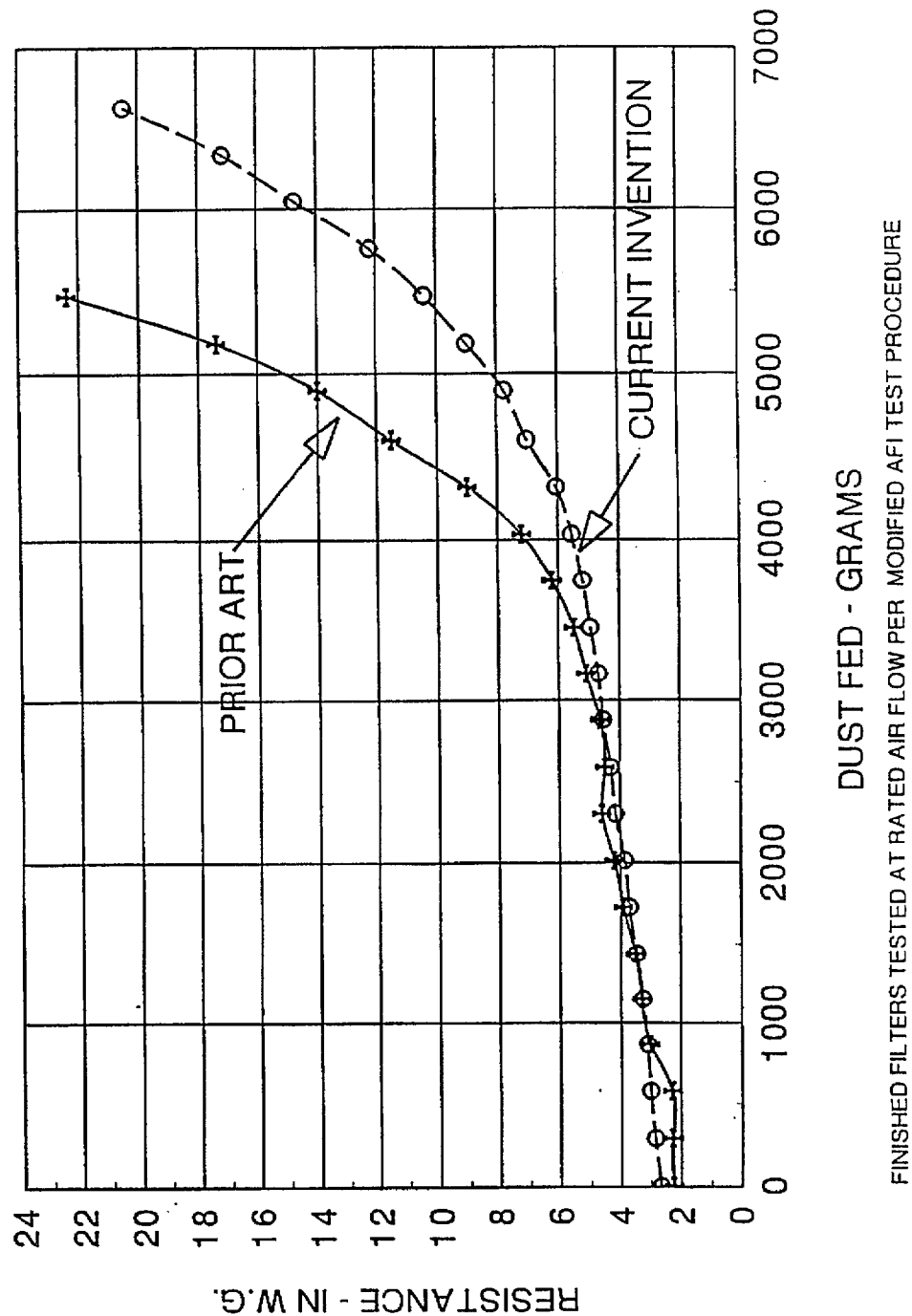

5,667,544

EXTENDED LIFE FILTER APPARATUS

BACKGROUND OF THE INVENTION

The present invention relates to a filter apparatus for separating contaminant particles from a fluid stream and more particularly to a gaseous fibrous filter medium of variable density which can be selectively layered and adhesively treated in a unique and novel manner to be particularly assembled as a pocket type filter for extended life engine intake use.

Layered, adhesively treated, varying density engine inlet filters arranged in pocket form have been long known in the engine intake art and, in fact, several prior art patents were cited in the long since abandoned patent application, U.S. Ser. No. 561,884 applied for by joint inventors, Richard L. Smith and Robert W. Sexton, (copy enclosed) in the latter part of 1983 or early 1984. In this abandoned application, Examiner cited a number of references, four of which were considered to be particularly pertinent. GB patent No. 2,036,591, inventor Roy E. Cleaver published on Jul. 2, 1980 and U.S. Pat. No. 3,710,926 issued to Robert W. Sexton et al on Jan. 16, 1973, both teach multilayered fibrous filters. U.S. Pat. No. 3,201,926, issued to F. G. Harrington on Aug. 24, 1965 teaches the use of an adhesive coating impregnated in the filter fibers. Further U.S. Pat. No. 4,093,437, issued to H. Ichihara et al on Jun. 6, 1978, teaches a multilayered filter material of different densities, as does recently issued U.S. Pat. No. 5,496,627, issued to Shriram Bagrodia et al on Mar. 5, 1996.

Acknowledging that adhesively dispersed, multi-layered, different density fibrous filters in the form of open-mouth supported pocket members are known in the art, as taught by the above-noted several references, the present invention combines the several recognized features of the prior art in a unique, novel and inventive manner to provide a straightforward and economical filter apparatus which can be readily manufactured and maintained to provide a new and unexpected filter arrangement which is highly efficient with a comparatively high particulate separation and with a higher holding capacity at a given pressure drop without premature faceloading and filter media collapse. Further, in accordance with the novel filter structure of the present invention, during a gas treating operation, there is a reduction of downstream pressure drop without a corresponding reduction in particulate capturing and retention as a consequence of the unique increase of fiber density accompanied by a corresponding increase in adhesive quantity in planar sheet-like form, serving to provide a final means for particulate capture from the treated fluid stream. Thus, not only is the filtration efficiency greatly improved, but filtration life is greatly extended. Such high efficiency filtration with extended filter life has particular importance in the application of engine intake filters for locomotives, where the ordinary maintenance change-out period for a locomotive filter now can be increased two-fold without sacrifice of filtration efficiency and controlled pressure drop.

Various other features of the present invention will become obvious to one skilled in the art upon reading the disclosure set forth herein.

SUMMARY OF THE INVENTION

More particularly, the present invention provides a filter apparatus for removing particulate matter from a fluid stream to be treated comprising: at least one layer of porous filter medium of preselected thickness transversely disposable in the fluid stream to be treated to present upstream and downstream faces with a preselected thickness therebetween with the filter medium being of preselectively and progressively increasing density between the upstream face and toward the downstream face; and, at least one application of viscous adhesive material applied to the filter medium in planar, sheet-like format a preselected location and quantity between the spaced upstream and downstream faces to provide an adhesive barrier extending transversely and substantially uniformly across the filter medium, so as to enhance further particulate separation from the treated fluid stream. In addition, the present invention provides for layered, expansible-compressible fibrous filter media with the first upstream layer(s) being similar in thickness and each of progressive density, each with a preselected quantity of viscous adhesive material transversely and uniformly on the downstream face thereof in planar, sheet-like form and with the last layer being of lesser preselected thickness with a much higher fiber density and a preselected larger quantity of viscous adhesive material on the upstream face thereof extending transversely and uniformly in planar, sheet-like form. Further, the present invention provides for such a layered, expansible compressible filter media arrangement in stitched pocket form with longitudinally extending seam stitches being either in tight stitch arrangement or with intermediate longitudinally extending seam stitches in span arrangement to allow continuity of the filter medium of adjacent pockets and to maintain a preselected final transverse optimum thickness of the layers adjacent the seams to more fully utilize the filter media.

It is to be understood that various changes can be made by one skilled in the art in one or more of the several features of the present filter apparatus without departing from the scope or spirit of the invention. For example, several types of preselected viscous adhesive materials can be utilized in selectively spaced, sheet-like planar quantities to extend transversely and uniformly relative the filter medium, as can different geometric filter arrangements be used, other than the disclosed pocket-type form.

BRIEF DESCRIPTION OF THE DRAWINGS

Referring to the drawings which disclose an advantageous embodiment of the present invention and a unique and novel modification thereof:

FIG. 7 discloses an AAR (American Association of Railroads) test performance comparison, charting the performance of the most efficient similar type prior art filter known against a comparable filter constructed in accordance with the present invention, with the vertical axis indicating particulate arrestance percentages and the horizontal axis indicating quantity in grams of dust fed in incremental fashion.

FIG. 8 discloses another AAR test performance comparison of the same filter units as in FIG. 7, only indicating resistance in water gauge against particulate quantity in grams of dust fed in incremental fashion.

DETAILED DESCRIPTION OF THE INVENTION

Referring to FIGS. 1–6a of the drawings, filter media assembled as a filter apparatus in accordance with the novel features of the present invention is disclosed. In these Figures of the drawings, the novel filter media arrangement is assembled in preselected layered form, folded into facing sections (FIGS. 1 and 2) and stitched along spaced longitudinally extending seams (FIGS. 3–6a) to form an inventive open mouth pocket-type unit filter of an arrangement particularly useful on engine intakes of diesel locomotives. It is to be understood that many of the features of the present invention are not be to be considered as limited to the particular pocket-type unit filter with the three layered facing and stitched sections as disclosed but that other forms of filter units can be constructed to incorporate many of the novel features of the inventive arrangement disclosed herein.

Figure 1:
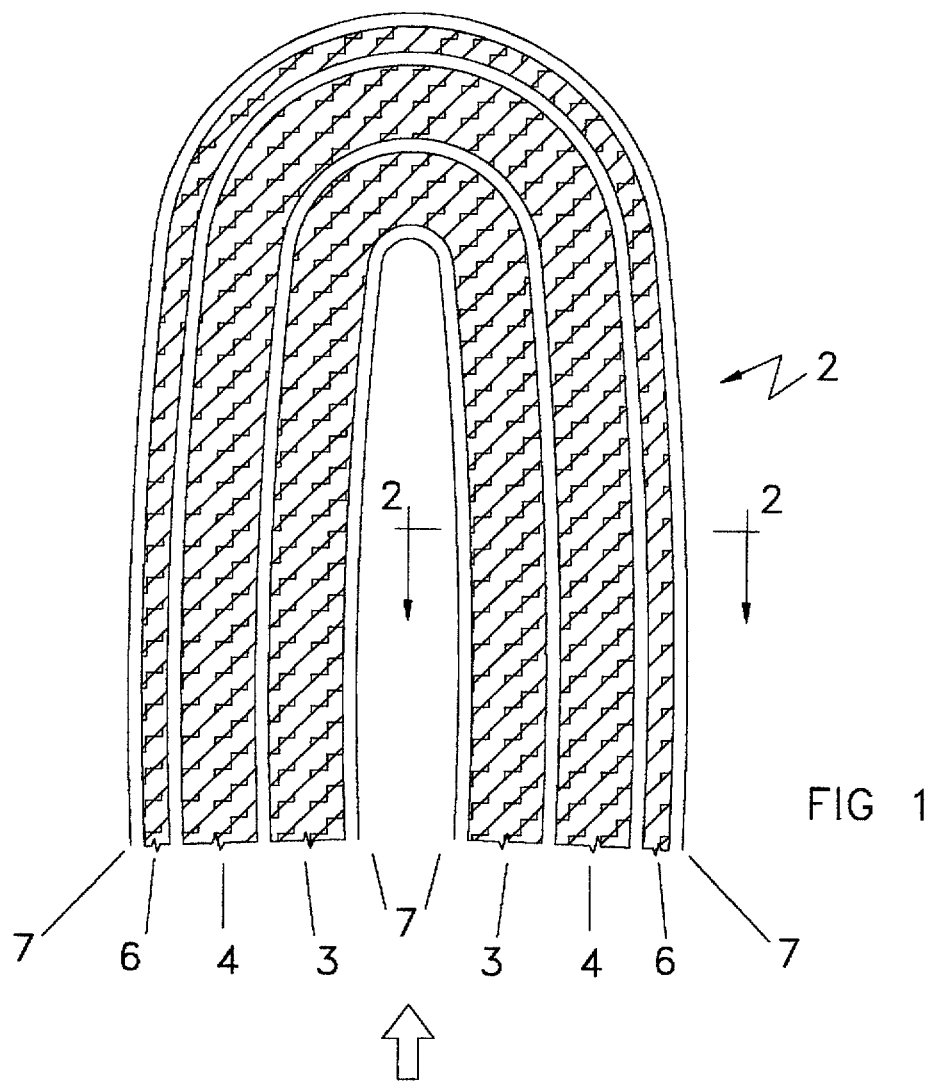
FIG. 1 is an open end view of the inventive, expansible-compressible fibrous filter media in scrim surrounded, folded facing section form, the first two upstream fibrous layers being of similar thickness and of varying density, having been treated along the upstream and downstream face transversely and uniformly with a depth penetrating treatment of a preselected quantity of viscous adhesive material and the last downstream layer of fibrous material of approximately one fifth the thickness and of varying density having been treated transversely and uniformly along the upstream face with a preselected larger quantity of viscous adhesive material in planar sheet-like form.

Referring particularly to FIG. 1 of the drawings, the assembled novel layered filter media 2 is disclosed. Layered filter media of FIG. 1 is composed of two similar upstream filter media sheets 3 and 4 of graduated density, expansible-compressible, moisture resistant spun fiberglass in the approximate range of two and one quarter to two and three quarter inches (2¼–2¾") and advantageously of approximately two and one half inches (2 ½") in thickness with each layer having a fiber diameter on the upstream face in the approximate range of forty-four to fifty-two micrometers (44–52 µm) and advantageously of approximately forty eight micrometers (48 µm) and a fiber diameter on the downstream face in the approximate range of thirty to thirty eight micrometers (30–38 µm) and advantageously of approximately thirty four micrometers (34 µm) and with each layer having a transversely and uniformly extending, depth penetrating tri-aryl phosphate ester, gelled to a high viscosity in the range of approximately nine point zero to ten point five grams per square foot of face area (9.0 to 10.5 gms/sq.ft.) and advantageously nine point seven grams per square foot of face area (9.7 gms/sq.ft.) on the upstream face and in the approximate range of fourteen point eight to sixteen point two grams per square foot (14.8 to 16.2 gm/sq.ft.) and advantageously fifteen point five grams per square foot (15.5 gm/sq.ft.) extending transversely and uniformly on the downstream face thereof. The downstream, third layer 6 is in the approximate range of one quarter inches to three quarter inches (¼ to ¾") thickness and advantageously of one half inches (½") thickness with a fiber diameter on the upstream face in the approximate range of twenty four to thirty two micrometers (24–32 µm) and advantageously twenty eight micrometers (28 µm) and a fiber diameter in the approximate range of twenty two to thirty micrometers (22–30 µm) and advantageously twenty six (26 µm) on the downstream face and with an adhesive application of tri-aryl phosphate ester, gelled to a high viscosity extending transversely and uniformly in sheet-like planar form only on the upstream face in the approximate range of twenty six point two to twenty-eight point two grams per square foot (26.2–28.2 gms/sq.ft.) and advantageously twenty seven point two grams per square foot (27.2 gms/sq.ft.). It is to be understood that although expansible-compressible spun-glass fiber material can be advantageously employed for the three layer sheets of filter media, it also would be possible to employ layers of other filter material, such as spun polypropylene or other synthetics. Further, it would be possible to use a single sheet of expanded fibrous sheet material expanded to an appropriate preselected thickness with appropriately spaced sheets of adhesive material applied transversely and uniformly in preselected quantities to extend transversely across the filter media in the manner as above described. To accomplish this a fork-like instrument with spaced, equally sized, perforated tubular tynes extending from an adhesive supply header could be employed to introduce the adhesive in sheet-like planar form so as to extend in a transverse and uniform manner.

Figure 2:
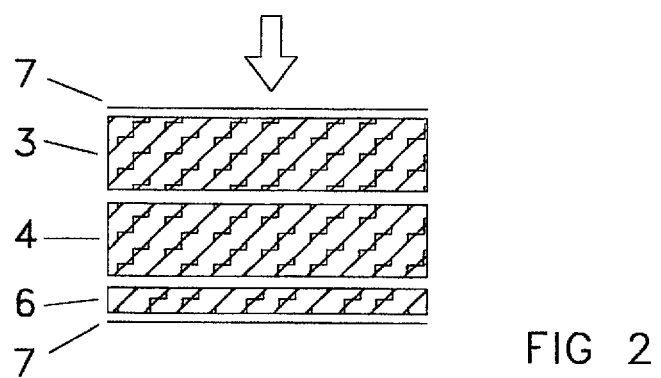
FIG. 2 is a cross-sectional view along line 2—2 of the layered filter media of FIG. 1, also including the thin layer of scrim material on opposite faces of the preselectively adhesively treated, layered filter media.
Figure 3:
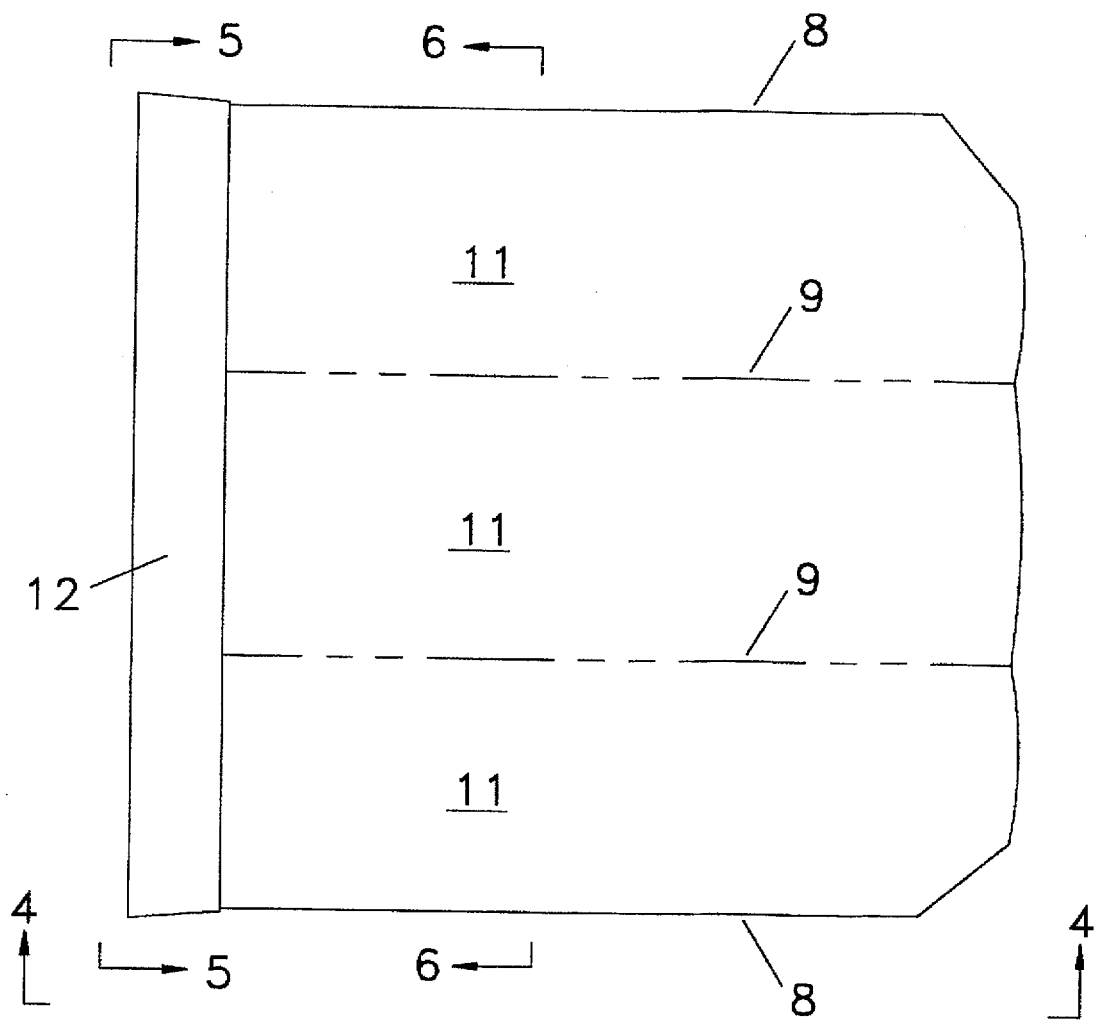
FIG. 3 is a plan view of the layered and treated filter media of FIGS. 1 and 2, further disclosing the pocket forming longitudinal seam stitches and the rigid open mouth header frame.
Figure 4:
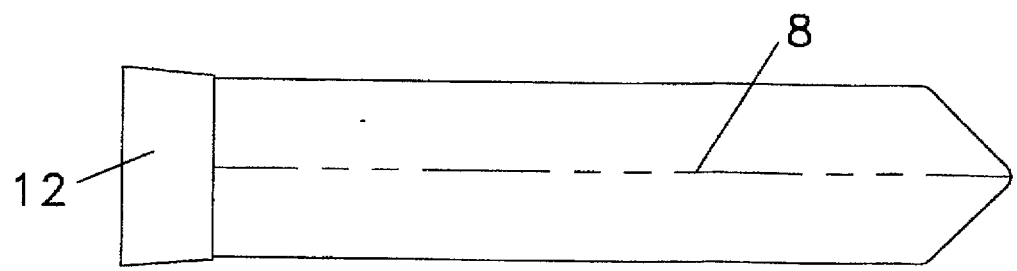
FIG. 4 is a side view of the pocket filter arrangement of FIG. 3.
Figure 5:
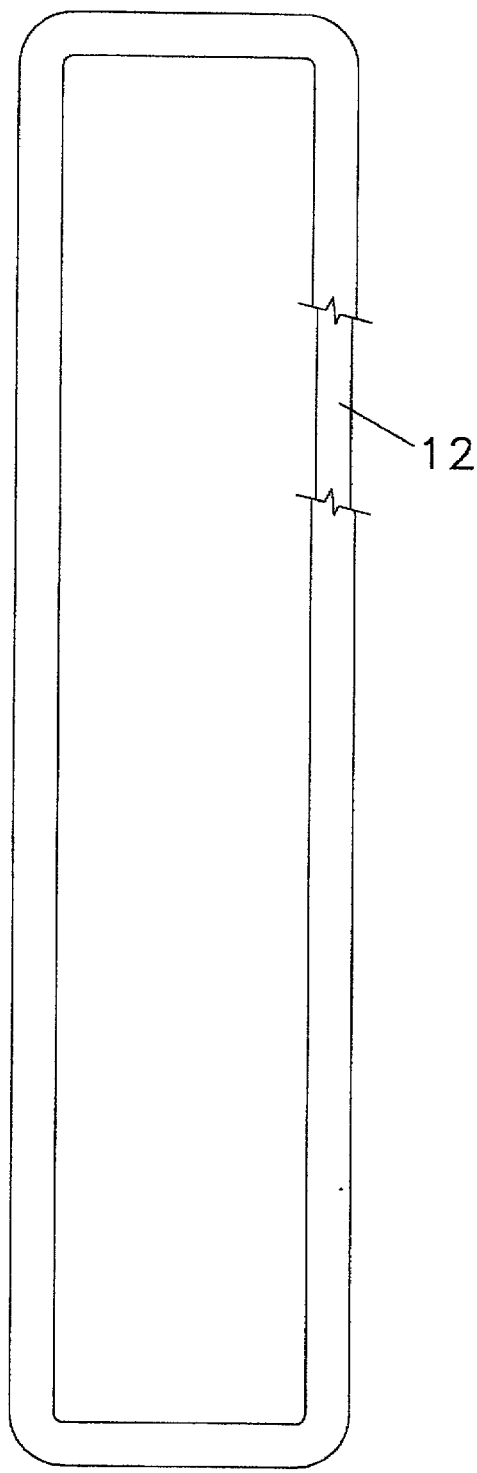
FIG. 5 is an enlarged view of the open mouth end of FIGS. 3 and 4.

Referring to FIGS. 1 and 2 of the drawings, it can be seen that an appropriately selected scrim material 7, such as a four by four (4×4) polypropylene net, can be employed to face the upstream outer and downstream inner opposite faces of the above described layered filter media 2. As can be seen in the drawings, the two joined sections of the layered filter media 2 are folded to face each other to form a closed end and an opposite open-mouthed end. The facing sections of layer 2 are then joined together by longitudinally extending seams 8. Seams 8 are positioned to extend along the facing edges of the facing sections and longitudinally extending intermediate seams 9 are transversely spaced and positioned to form pocket members 11, each pocket 11 being closed at one end by the joined folded sections, as above described, and each having an open-end mouth at the other end. Once the layered media 2 has been formed into pockets 11, the open end mouth is then stitched to a rigid header frame 12 in a manner as known in the art.

Figure 6:
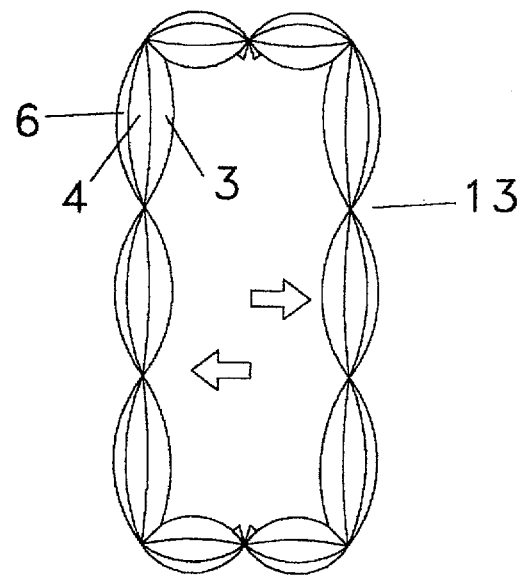
FIG. 6 is a cross-sectional view of a pocket portion disclosing a tight stitch seam arrangement.
Figure 6A:
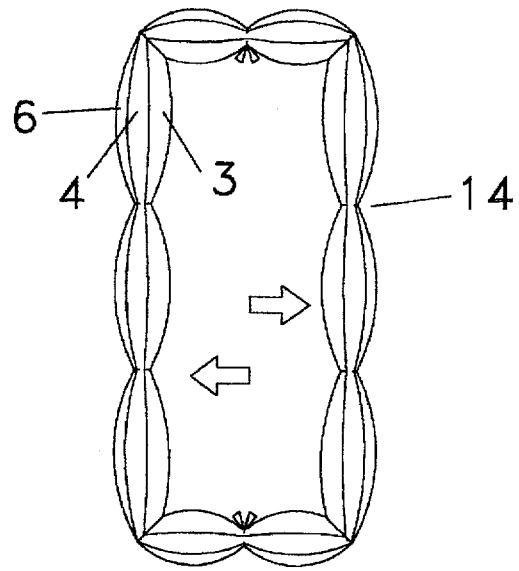
FIG. 6a is a cross-sectional view similar to that of FIG. 6 disclosing a modified span stitch seam arrangement, allowing for filter media continuity between adjacent pockets.

Referring to FIG. 6 of the drawings, it can be seen that a tight stitch 13 can be employed with the expansible-compressible media of facing layered sections being tightly compressed between the spaced stitches, substantially sealing the layered media between adjacent pocket members 11. Alternatively, as can be seen in FIG. 6A of the drawings, and in accordance with another feature of the present invention, spanned stitches 14 can be used with the expansible-compressible media of facing layered sections being positioned between spaced apart hold down members so that the expansible-compressible media between adjacent pocket members 11 is compressed only a preselected amount to allow the extension and continuity of the layered media between adjacent pocket members 11 to more fully utilize the filter media.

Referring to FIGS. 7 and 8 of the drawings which disclose test performance characteristics conducted in accordance with AAR (American Association of Railroads) industry test procedures for testing pocket type filters of the type utilized as diesel locomotive air filters, it can be seen that the filter apparatus of the present invention performs with higher efficiency both as to dust arrestance percentage and as to rate of resistance rise as dust is collected. These AAR tests leading to the performance test comparison characteristics as disclosed in the charts are known to one skilled in the filter arts and involve elaborate controlled test procedures described in an available AAR draft publication. The controlled AAR test parameters include, but are not limited to factors such as apparatus stabilization and mounting position, temperature, relative humidity, air flow, test dust and variable feeding rate control and specified test duct equipment in order to insure test comparison accuracy.

In a typical performance test procedure, after preconditioning, clean filter pressure drop is measured over an extended operating range of the tested filter element, preselectively 700 to 3500 cfm. The data is corrected to standard conditions, and is plotted to graphically show pressure drop as a function of air flow rate. A dust loading test is then conducted with the airflow being alternated hourly from 845 to 1695 to 2550 cfm while feeding Arizona Road, Fine Test Dust at a constant rate of 96 grams per hour. The dust passing through the tested filter element is collected by a downstream absolute filter and is changed each hour so that the incremental efficiency during each airflow segment can be determined. To allow for proper dust wicking, no more than six (6) one hour feeding segments are conducted in a 24-hour period. Dust feeding is continued until the pressure drop across a filter element at 2550 cfm reaches 20 inches of measured water gauge pressure drop. Dust capacity is defined as the total weight of dust fed to the filter multiplied by the dust weight arrestance at the 20 inches pressure drop. Pressure drop values are recorded at the beginning and end of each segment so that the pressure drop as a function of dust amount fed can be monitored and graphically reported.

Following dust loading an air volume cycling test is performed without feeding additional dust. During this test, the airflow through the filter is smoothly varied from 0 to 2550 to 0 cfm at a rate of 12 cycles per minute for 1000 cycles. The pressure drop across the element at 2550 cfm is monitored and the weight of the filter is taken after 0, 100, 200, 400, 600 and 1000 cycles so that the incremental and cumulative amount of dust sloughing of the filter can be determined.

From such tests as above described, the improved performance characteristics of the above described inventive apparatus when compared with a best known filter of the prior art was determined as is shown in FIGS. 7 and 8. These improved performance characteristics have resulted in extended life filters for diesel engine intakes allowing the extension of the locomotive engine maintenance cycle period from a formerly three (3) month period requirement to the dramatically improved present period of maintenance of six (6) months, all with the use of filter units of the present invention.

The invention claimed is:

1. A filter apparatus for removing particulate matter from a fluid stream to be treated comprising:

at least one layer of porous filter medium of preselected thickness transversely disposable in said fluid stream to be treated so as to present upstream and downstream faces with a preselected thickness therebetween with the filter medium being of preselectively progressively increasing density between said upstream face and toward said downstream face; and, at least one application of viscous adhesive material applied to said filter medium in planar sheet-like form at a preselected location and quantity between said upstream and downstream faces to provide an adhesive barrier extending transversely and uniformly across said filter medium to enhance further particulate collection from said fluid stream.

2. The filter apparatus of claim 1, said filter comprising at least two separate layers of fibrous filter medium with the fibers decreasing in diameter between said upstream and downstream faces.

3. The filter apparatus of claim 1, said filter medium being of moisture resistant spun fiber glass.

4. The filter apparatus of claim 1, said filter medium being of moisture resistant spun polypropylene.

5. The filter apparatus of claim 1, said viscous adhesive material being a tri-aryl phosphate ester, gelled to a high viscosity to provide a cohesive and sticky fluid barrier.

6. The filter apparatus of claim 1, at least two spaced applications of adhesive of preselected quantity with the preselected quantity downstream being the greater quantity and in planar, sheet-like form.

7. The filter apparatus of claim 1, said filter medium being in sheet material form folded upon itself and seamed along the longitudinal edges and along spaced longitudinally extending intermediate seams to provide compression lines therebetween to provide open mouth spaced longitudinally extending pockets therebetween.

8. The filter arrangement of claim 7, each of said spaced longitudinally extending intermediate seams including spaces therebetween to allow for media continuity between said longitudinally extending pockets formed between said spaced longitudinally extending intermediate seams.

9. The filter arrangement of claim 1, said filter medium being in sheet material to include three layers of fibrous filter medium the first two upstream layers each being substantially similar in the thickness and of decreasing fiber diameter size from the upstream to the downstream faces thereof with each having a similar quantity of upstream and downstream face adhesive application with the quantity of adhesive application on the upstream faces being less than the quantity of adhesive applications on the downstream faces, the third downstream layer of fibrous filter medium being of lessor thickness than the two similar upstream layers of fibrous filter medium, with the fiber diameters on the upstream and downstream faces of said third layer decreasing and less than the lowest fiber diameter of said two upstream layers and with the quality adhesive application on said third layer being similar to the quality of adhesive application on said first two layers and the quantity of adhesive application on the upstream face of said third layer being greater than the quantities on the upstream faces of said first two layers of fibrous medium.

10. The filter arrangement of claim 9, said first two upstream layers of fibrous material being moisture resistant spun fiber glass, each of approximately two and one quarter to two and three quarter inches (2¼–2¾") thickness with each layer having a fiber diameter on the upstream face of approximately forty four to fifty two micrometers (44–52 µm) and a fiber diameter on the downstream face of approximately thirty to thirty eight (30–38 µm) and with each layer having a transversely extending, application of tri-aryl phosphate ester, gelled to a high viscosity of approximately nine point zero to ten point five grams per square foot of face area (9.0 to 10.5 gms/sq.ft.) on the upstream face and in the approximate range of fourteen point eight to sixteen point two grams per square foot (14.8–16.2 gms/sq.ft.) extending transversely on the downstream face thereof, with said downstream third layer being approximately one quarter to three quarter inches (¼" to ¾") thickness with a fiber diameter on the upstream face in the approximate range of twenty four to thirty two micrometers (24 μm to 32 μm) and a fiber diameter in the approximate range of twenty two to thirty (22 μm–30 μm) on the downstream face and with an adhesive application extending transversely in sheet-like planar form only on the upstream face in the approximate range of twenty-six point two to twenty eight point two grams per square foot of face area (26.2–28.2 gms/sq.ft.) of tri-aryl phosphate ester, gelled to a high viscosity.

11. A pocket filter apparatus including a plurality of longitudinally extending pocket members for removing particulate matter from a fluid stream to be treated comprising:

at least one pair of pockets formed from at least three layers of graduated expansible-compressible moisture resistant spun fiber glass filter media, the first two upstream layers of filter media being approximately two and one half inches (2½") thick with each layer having a fiber diameter on the upstream face of approximately forty eight micrometers (48 μm) and a fiber diameter on the downstream face of approximately thirty four micrometers (34 μm) and with each layer having a transversely and uniformly extending tri-aryl phosphate ester gelled to a high viscosity of approximately nine point seven grams per square foot of face area (9.7 gms/sq.ft.) on the upstream face and fifteen point five grams per square foot of face area (15.5 grm/sq.ft.) on the downstream face, with a downstream third layer of filter medium being approximately one half inch (½") thickness with a fiber diameter on the upstream face of approximately twenty eight micron (28 μm) side and with a fiber diameter on the downstream face of approximately twenty six micrometers (26 μm) and with the upstream face only having a transversely extending planar, sheet-like application of tri-aryl phosphate ester, gelled to a high viscosity of approximately twenty seven point two grams per square foot of face area (27.2 gm/sq.ft.) face area and with the downstream face having zero adhesive application; the three layers of filter media having a four-by-four (4×4) polypropylene scrim net layer on the outer and inner faces thereof and all of the layers being folded as joined sections facing each other to form closed ends of said pockets at one end and terminal supporting mouth portions of said pockets at the opposite end, said facing sections including longitudinally extending filter medium compression seams extending along the edges and in laterally spaced relation intermediate the edges to compress the filter medium therealong to provide said pockets and, a rigid flow-thorough frame member to fastenly receive the mouths of said pockets to provide an open-end mouth for each of said pockets opposite said closed pocket ends.

12. The pocket filter arrangement of claim 11, said longitudinally extending compression seams being of tight stitch to substantially isolate adjacent pockets from each other.

13. The pocket filter arrangement of claim 11, said longitudinally extending compressions seams being of preselectively spaced span stitch to allow the layered filter media of adjacent pockets to be in continuity with each other providing for more efficient filtration along adjacent pocket edges.

14. The pocket filter arrangement of claim 13, said span stitch providing a preselective spacing in the approximate range of one half to one and one half inches (½" to 1½").

* * * * *